United States Patent [19]

Collins et al.

[11] 4,270,203

[45] May 26, 1981

[54] TIMING ADJUSTMENT CIRCUIT FOR DIGITAL SWITCHING

[75] Inventors: Arthur A. Collins; Jon W. Bayless, Sr.; Robert D. Pedersen, all of Dallas, Tex.

[73] Assignee: Arthur A. Collins, Inc., Dallas, Tex.

[21] Appl. No.: 959,900

[22] Filed: Nov. 13, 1978

[51] Int. Cl.³ .............................................. H04J 3/07
[52] U.S. Cl. .................................................. 370/102
[58] Field of Search ......... 179/15 AF, 15 BD, 15 BS, 179/15 BY; 178/69.1; 325/4

[56] References Cited

U.S. PATENT DOCUMENTS

| 3,646,271 | 2/1972 | Shigaki | 179/15 AF |
| 3,970,796 | 7/1976 | Gyürki | 179/15 AF |
| 4,053,715 | 10/1977 | Drapkin | 179/15 AF |
| 4,156,111 | 5/1979 | Downey | 179/15 AF |

OTHER PUBLICATIONS

IEEE Transactions on Communication Technology; vol. COM-16, No. 2; Apr. 1968; "Synchronization of PCM Channels by ... Word Stuffing," by Butman.
Witt, F. J., "An Experimental 224 Mb/S Digital Multiplexer-Demultiplexer Using Pulse Stuffing Synchronization," Bell Systems Technical Journal, Nov. 1965, pp. 1843–1885.
Abate, J. E., Brandenburg, L. H., Lawson, J. C., and Ross, W. L., "The Switched Digital Network Plan," Bell System Technical Journal, Sep. 1977, pp. 1297–1320.
Gersho, A., and Karafin, B. J., "Mutual Synchronization of Geographically Separated Oscillators," Bell Systems Technical Journal, Dec. 1966, pp. 1689–1704.
Brilliant, M. B., "The Determination of Frequency in Synchronized Oscillators," Bell Systems Technical Journal, Dec. 1966, pp. 1737–1748.

*Primary Examiner*—David L. Stewart
*Attorney, Agent, or Firm*—Richards, Harris & Medlock

[57] ABSTRACT

A slip-free timing adjustment system adjusts channel timing for a multiplexed digital data stream. The data stream in each of c time division channels (10, 11) is modified preparatory to switching in a digital time-division circuit switch (14). The multiplexed digital data stream may arrive at the switch at a rate R0. The switch clock rate may be at a rate R1. Rates R0 and R1 are potentially different.

Signal means (12, 13) provide for inserting a variable length timing code, one bit at a time, in each of the c channels in each multiplexed digital data stream. The multibit timing code is composed of successive variable length code words of length L and L+1 bits.

Adjustment means (18, 42) receives the multiplexed data stream and adjusts individual channel rates in each of the c channels. This includes means for altering the length of the variable length code words by adjusting code words of length L to code words of length L+1 when the input clock is slower than the switch clock and for adjusting code words of length L+1 equal to code words of length L when the input clock is faster than the switch clock. By this means, the respective clock rates are equalized by the adjustment of just a sufficient set of code words in each of said channels to result in equal rates.

Means (24, 28, 25, 29, 43, 44, 45) provide for transmitting the adjusted time-division multiplexed channels to a digital-time-division switch (14) for channel switching under control of the switch clock (21).

12 Claims, 9 Drawing Figures

TIMING ADJUSTMENT CIRCUIT FOR DIGITAL SWITCHING TECHNICAL FIELD

This invention relates to time division digital transmission and switching and more particularly to the accommodation of digital time division signals from a plurality of sources at a common digital switch with each arriving signal having a potentially different clock frequency from the common digital switch frequency. These frequency differences can potentially arise from independent clock inaccuracies, environmental effects and/or doppler frequency effects.

In a more specific aspect, the invention relates to the insertion into each information channel of a time division multiplexed stream of such channels, timing codes which may be used at network switch points to adjust the individual channel rates to equal the common switch channel rate, thus permitting individual channels to be freely and selectively interconnected on different incoming and outgoing transmission paths without errors that would otherwise be caused by the pulse frequency differences between the respective channels.

BACKGROUND ART

The present invention is of particular significance in view of the increasing use of digital transmission and switching in voice and data telecommunication networks and the need for accurate information transmission through these networks. Heretofore, digital transmission systems have relied on "pulse stuffing" techniques to ensure accurate transmission of information in a digital multiplex hierarchy. With this approach, a higher level of the hierarchy designed to multiplex n lower levels signal together, each of rate R, will operate at a rate somewhat greater than Rn. Additional "stuffing bits" are added to each lower level multiplex group to bring the individual group rates up to the rate necessary for the higher level multiplex. These stuffing bits are removed when the signals are demultiplexed.

This approach is not appropriate for a switched network. Digital switching requires equal rates for individual channels. This is necessary to allow information from a channel of one multiplex stream to be switched to a different channel of a different multiplex stream without errors caused by timing difference. If the first channel were faster than the second, all of the incoming bits could not be accommodated in the outgoing channel. If the second channel were at a higher rate, there would not be sufficient incoming information bits to fill the outgoing channel. Both of these situations would cause errors. It should also be noted that the same situation prevails in a purely multiplex system that has a requirement to drop and insert digital channels.

Various approaches to network synchronization have been proposed to equalize clocks throughout a large network. Master/slave arrangements are possible wherein, for example, a relatively expensive atomic standard is used as a clock source and other clocks are slaved to this master. Mutually synchronized clock systems have also been studied with individual clocks arranged in a manner that attempts to achieve an average network frequency based on information from each clock. The use of highly stable, independent clocks is yet another possibility. Even with these measures, it is not possible to completely control clock signals and slip errors will eventually occur.

In a network with highly stable clocks, the occurence of such slip errors will be infrequent, occurring once in every several hours on each multiplex link. The infrequent occurence of these slip errors makes them tolerable. There are situations, however, that give rise to higher slip error rates that do represent a potentially serious system impairment. Consider, for example, transmission from a mobile station over a multiplex radio transmission link with high doppler frequency offset. With relative velocities of 1000 km/h, the doppler shift will be approximately one part in $10^{}6$. With a doppler shift of one part in $10^{}6$, relative timing will drift 125 microseconds in a period of $(125)(10^{}-6)(10^{}6) = 125$ seconds. An interval of 125 microseconds corresponds to the time for one eight bit pulse code modulated voice sample at 64 kilo bits per second. Thus with an eight bit digital switch and appropriate buffering, a timing slip would occur every 125 seconds. This slip rate would be unacceptable to users with encrypted voice traffic wherein loss of cryptosync would result. The present invention is particularly useful, then, for timing adjustment of multiplex signal streams from high-speed mobile terminals. These terminals may have additional equipment for voice signal encryption. The circuitry disclosed in the present invention ensures proper operation of this equipment by removing slip errors.

DISCLOSURE OF THE INVENTION

In accordance with the present invention, slip errors due to mobile doppler offset are entirely eliminated in a digital switched network involving a plurality of clocks each potentially offset one with respect to the other yet requiring switching under the control of a single switch clock in a completely integrated digital switching and transmission network. This is accomplished by inserting timing codes in each individual transmission channel to allow adjustment of the channel rate to be equal to the switch clock rate, thereby allowing switching under control of the coommon switch clock. The timing code consists of a fixed length field and a variable length field. The fixed length field is used to indicate the state of the variable length field. More particularly, a selected code word in the fixed length field will indicate the presence of a bit in the variable length field. A different and distinct separate code word in the fixed length field will indicate the absence of a bit in the variable length field. Thus, through proper use of these code words, the effective data rate in individual channels may be varied to be equal to the switch clock rate, allowing digital circuit switching of the respective channels without the occurence of slip errors.

A principle aspect of the present invention is the digital circuitry to control the adjustment of channel rates at the input to a digital switch when individual channels are inbedded in a received multiplexed information stream consisting of a plurality of such channels. All channels must be adjusted to avoid slip errors. Circuitry capable of accomplishing such adjustments while making maximum use of shared logic is provided by this invention.

BRIEF DESCRIPTION OF THE DRAWINGS

A specific embodiment for carrying out the invention is illustrated in the accompanying drawings.

In the drawings.

DETAILED DESCRIPTION

Figure 1:
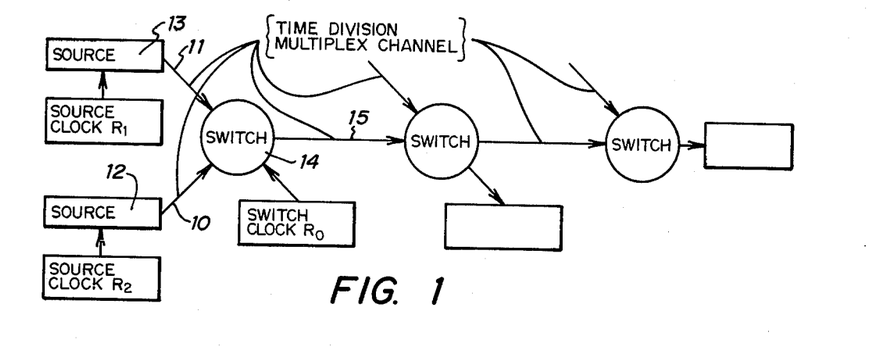
FIG. 1 illustrates the general structure of a digital switch network with links of different rates requiring switching under control of a common clock.
Figure 2:
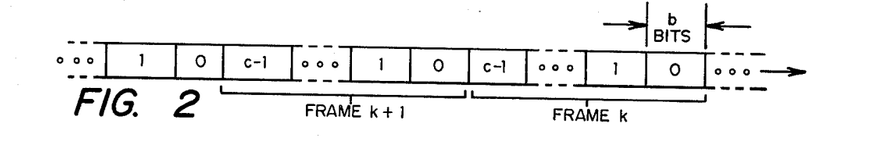
FIG. 2 depicts the data stream structure illustrating the c multiplex channels per frame.

FIGS. 1 and 2

In the network of FIG. 1, time division multiplexed signals on links 10 and 11 from two different sources 12 and 13 are brought together for switching at a common switch node 14 operating with a clock of rate R0. The multiplex group structure for each of the signals on links 10 and 11 are of the form illustrated in FIG. 2. Each consists of c multiplexed channels with b bits per channel time resulting in cb bits per frame. The channels numbered 0, 1, ... C−1 are repeated each frame time k, k+1, etc. yielding a channel rate of R1/c for the signal on link 10 and R2/c for the signal on link 11.

Output links from switch 14 likewise are time division multiplexed with c channels per frame. On the output link 15, for example, the channel rate with be R0/c.

From FIG. 1 it will be understood that unless timing adjustments are made at the digital switching node 14, transmission errors will be made in selectively interconnecting channels from links 10 and 11 to form those on link 15. For example, if R1/c > R0/c, data will be lost. If R1/c < R0/c, extra bits will exist in output channels of link 15 which are carrying data from input link 10. Similar conditions apply if R2/c > R0/c or if R2/c < R0/c.

Figure 3:
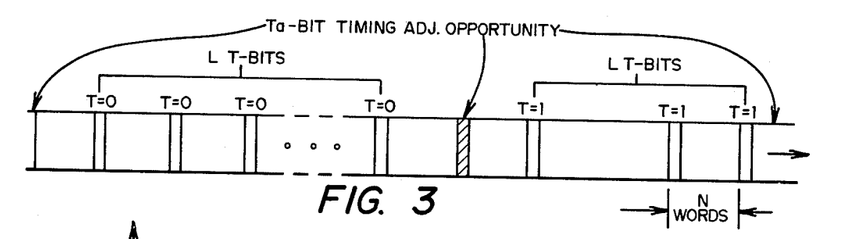
FIG. 3 illustrates the timing code structure within each channel.

FIG. 3

The present invention uses a variable length timing code in each channel to indicate when timing adjustments can be made. This variable length timing code structure within each channel is illustrated in FIG. 3 where a distributed code is employed. Code bits (T-bits) are inserted on the word boundary after N consecutive words. L T-bits are followed by a timing adjustment opportunity, Ta. For example, a sequence of L T-bits all equal to one may be used to indicate that the following timing code bit is a timing adjustment opportunity, Ta. A sequence of L T-bits equal to zero would signify that no Ta bit is present. The timing code is inserted in a message channel at transmitting terminals 12 and 13. The successive strings of T-bits are set alternately to 1 and 0. The code is removed at the receiving terminal. Timing adjustments are made at switch node 14 to individual channels to adjust the input link rate, R1, to the switch rate, R0. This timing adjustment code structure results in a nominal overhead ratio of $$\frac{2b(L + 1)N + (2L + 1) \text{ channel bits}}{2b(L + 1)N \text{ data bits}} \tag{1}$$

Timing slips are avoided by using the Ta bits to make adjustments on a multiplex group frame basis. The time for the input clock and the switch clock to drift an entire frame, one with respect to the other, will be called a frame drift cycle. The difference in the input rate and the local switch rate determines the period of the frame drift cycle as $$Tc = bc/(R0 - R1) \tag{2}$$

By assuming limits on the relative stability of R0 and R1, a minimum frame drift period can be calculated. A sufficient number of timing adjustment opportunities is caused to occur within the frame drift cycle to permit b timing adjustments in each of the c channels. This corresponds to a total addition of bc Ta-bits (if the input is running slow) or the deletion of bc Ta-bits (if the input is running fast) during one frame drift cycle. Stated another way, by the end of one frame drift cycle the timing adjustment circuit will advance the timing of every channel in the mux group by one frame interval (if the input is running slow) or retard the timing by one frame interval (if the input is running fast). This is accomplished by making single Ta bit insertions or deletions in individual channels over the total frame drift cycle.

Figure 4:
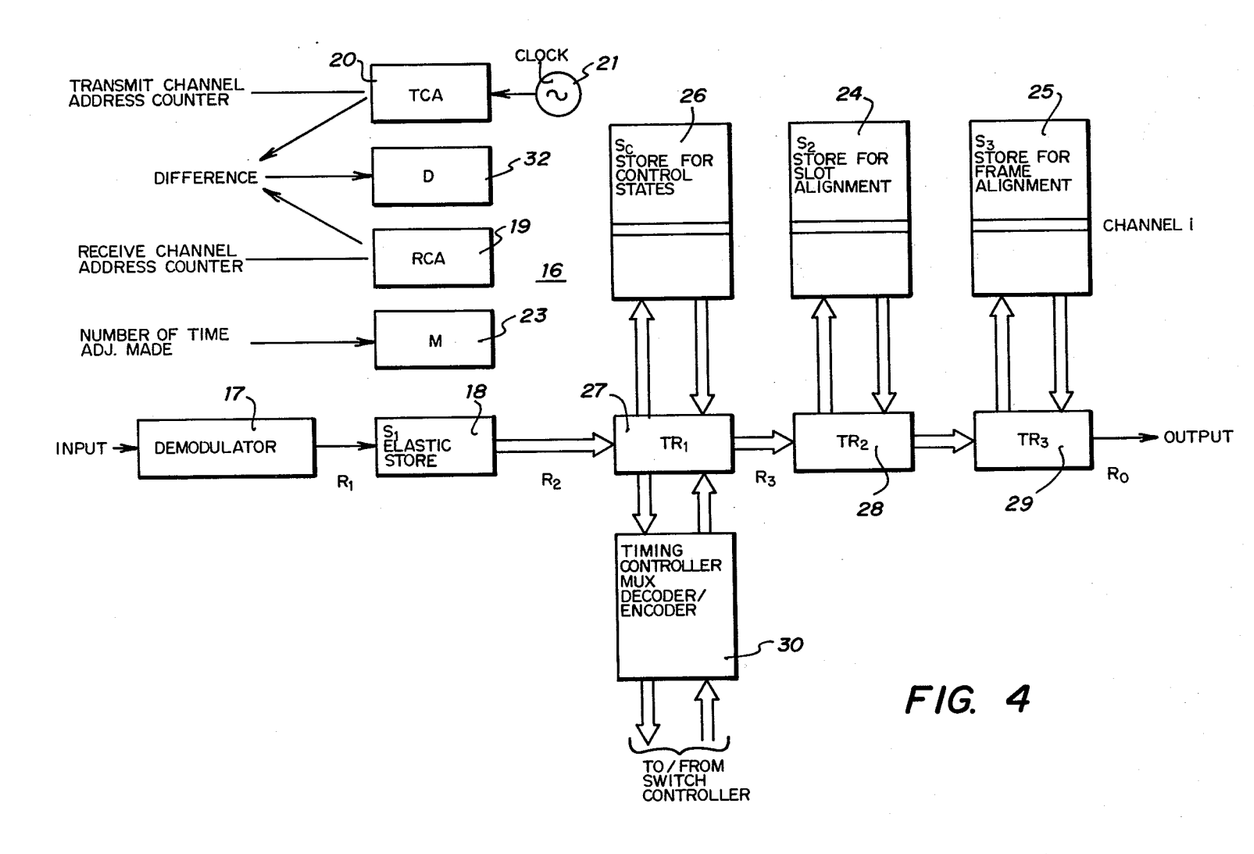
FIG. 4 is a general showing of the timing adjustment circuit.

FIG. 4

A functional diagram of the slip-free mux group time adjustment circuit 16 is illustrated in FIG. 4. The input is running at the link rate R1. The output is running at the switch rate R0. The link rate can be greater than, equal to, or less than the switch rate. Because the input and output are running at different rates, address information is maintained on both the input and output data streams. The input signal is demodulated in demodulator 17. The channel address of each input segment leaving the S1 elastic store 18, is maintained in a received channel address register (RCA) 19. The channel address of each output segment is stored in the transmit channel address register (TCA) 20. TCA 20 is a clock counter driven by the switch frequency reference, source 21. The displacement between the count in RCA 19 and the count in TCA 20 is maintained in the D register 22. The M register 23 maintains a count of the number of timing adjustments that have been made.

Three stages of data store are provided in the time adjustment circuit to achieve the slip-free change from group rate R1 to group rate R0. S1 elastic store 18 is a serial buffer that provides bit alignment and accommodates short-term variations in the flow rate caused by waiting for occurrences of timing adjustment opportunities. The S2 slot alignment store 24 provides storage for alignment of data segments between successive occurrences of a channel time slot within a mux group. The S3 frame alignment store 25 provides storage for alignment of channels between input and output frames. State information on each channel is maintained in the control store 26. The TR1, TR2, and TR3 transfer registers 27, 28, and 29 control data transfers between the stores and also provide buffering and serial-to-parallel or parallel-to-serial operations were required. TR1 27 will be referred to as the timing code operations register. It is in this register that timing adjustment bits (T-bits) are inserted or deleted.

The operation of the timing adjustment circuit is under the control of the timing controller and mux decoder/encoder, 30. Unit 30 interprets all in-channel codes including the timing code and initiates all required control actions.

Three distinct storage functions are performed in the timing adjustment circuit 16. The first function is a combined bit alignment and short-term waiting operation. Whenever a clock boundary is encountered, the phase between input and output data streams will be misaligned. Therefore bit alignment must be achieved. Also, with a variable length timing code, the waiting interval between timing adjustment opportunities is variable. The S1 serial elastic store 18 in FIG. 4 performs the bit alignment function as well as serving as a short-term buffer to obtain an expanded waiting interval for available timing adjustment opportunities.

The second function that is performed is segment alignment following single bit insertions or deletions. As described above, the variable length timing code causes single bit timing adjustments to be made within each channel. However each channel is restricted to a segment b-bits in length in its assigned time slot in both input and output data streams. Thus single bit timing adjustments result in displacement of data between the assigned time slot on successive frames. For each channel, frame-to-frame displacement must accumulate to a total of b bits before the displacement can be handled as a b-bit segment by the mux group. Segment alignment operations require an available storage of one segment for each channel in the mux group for a total storage requirement of bc bits. The S2 segment alignment store 24, in FIG. 4, is employed for this purpose.

The third function that is performed is frame alignment. The frame alignment operation provides a store location for each channel to ensure that data frame channel i on the input frame is transferred to channel i in the output frame. This operation also involves a store of one segment for each channel in the mux group for a total storage requirement of bc bits. The S3 frame alignment store 25, in FIG. 4, is employed for this purpose.

Although all three stores 18, 24 and 25 perform alignment operations, they function distinctly differently. Elastic store, 18, provides short-term bit-level buffering to accommodate differences in clock rates. S2 slot alignment store 24 provides reassembly of channel segments between successive frame. S3 frame alignment store 25 provides segment level buffering to accommodate differences in the frame rate between input and output mux groups.

Figure 5:
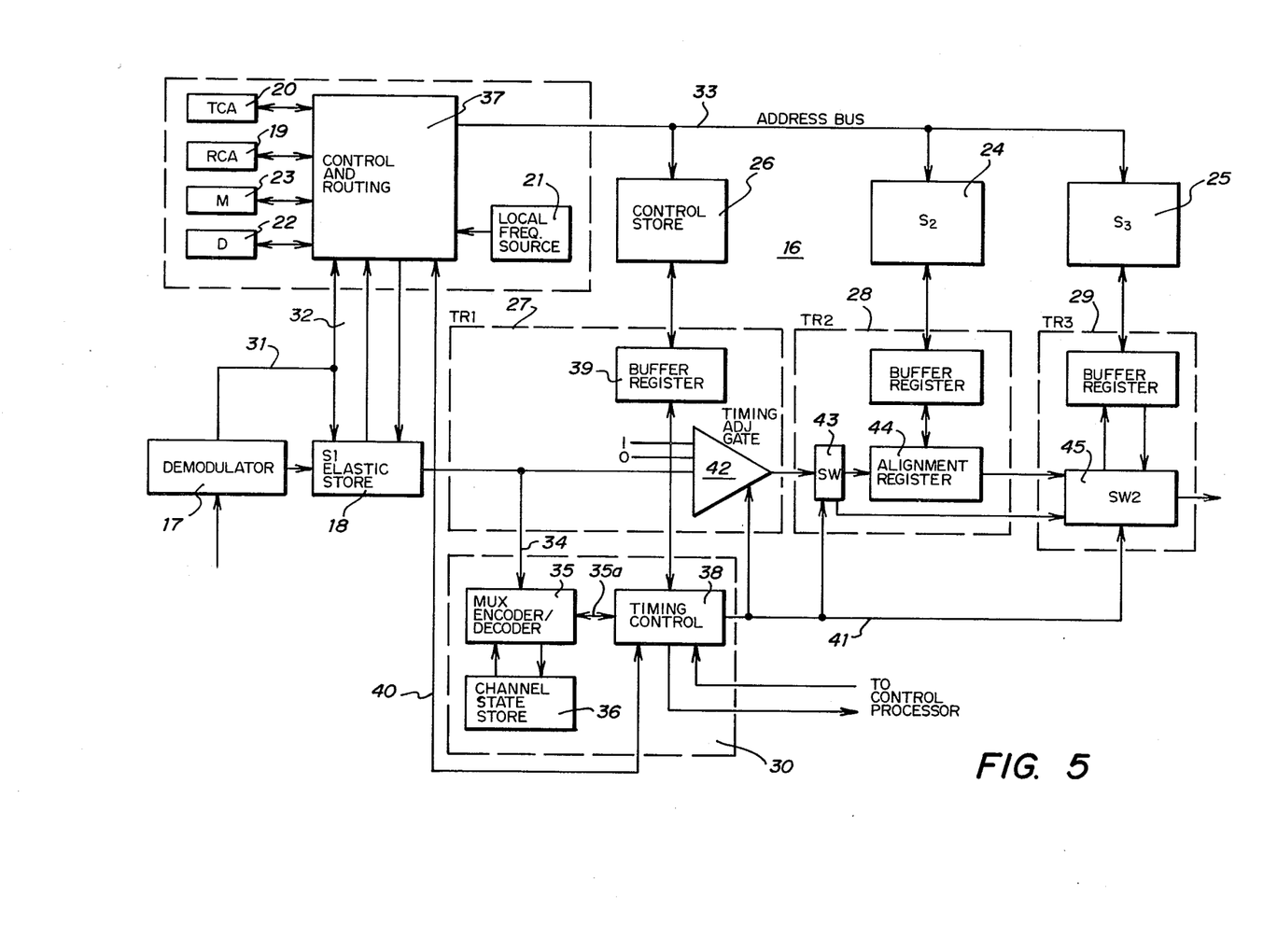
FIG. 5 is a more detailed showing of the timing adjustment circuit.

FIG. 5

FIG. 5 is a more detailed showing of the timing adjustment circuit 16 of FIG. 4. Data paths through the transfer registers, 27, 28, and 29, are shown in more detail as are the timing controller and multiplex encoder/decoder, 30, features.

The input transmission link terminates on the demodulator 17 which outputs the received data bits to the elastic store 18. Writing of the elastic store is executed under control of the receive clock signal on connection 31 and supplied from demodulator 17. Clock connection 31 is also connected to the control and routing circuitry 37 associated with the TCA, RCA, M, and D registers. The receive clock channel 31 is used to control incrementing of the receive channel address counter RCA 19. Also connected to this control and routing circuitry 37 is the local frequency source 21. All data transfers out of the elastic store and in subsequent transfer registers and memory operations are timed with local clock 21. The transmit address register TCA 20 receives its control from the local frequency source 21. The difference between TCA register 20 and RCA register 19 is maintained in D register 22. M 23 register records the number of timing corrections that have been made during the frame drift cycle. An elastic store fill signal on channel 32 indicates to the control and routing circuitry 37 the number of bits currently stored in the elastic store 18.

Control store 26 and the S2 and S3 data buffers 24 and 25 are addressed over the address bus 33 from the control and routing unit 37. RCA 19 provides the necessary addresses for reading and writing in control store 26 and the S2 buffer 24. RCA 19 is also used for the write address into S3 store 25. S3 store is read using the contents of TCA 20 as an address.

Continuing with FIG. 5 the received signal is routed over signal line 34 to multiplex encoder/decoder 35, which interprets individual channel control and timing signals. The state of each individual channel is maintained in a channel state store 36. Channel state information is fed from store 36 to channel control circuitry 38 which controls the timing adjustment operations, reads and updates the channel control store 26 and also communicates with a system control processor.

The present channel state signal from the channel state store 36, is combined with the incoming channel information over line 34 in the multiplex encoder/decoder 35 to decode the individual incoming channel timing adjustment codes, illustrated in FIG. 3, on a channel by channel basis. Timing adjustment control signals are generated by multiplex encoder/decoder 35 for each channel and routed over control line 35a to timing control circuitry 38. The timing adjustment state of each channel is stored in the control store 26 which is read in sychronism with S2 buffer 24 with channel address information provided over the address bus 33. Information signals from control store 26 pass through buffer register 39 to timing control circuitry 38. Control and routing circuitry 37 provides control signals on line 40 to the timing control circuitry 38 indicating when a timing correction needs to be made and in which direction as indicated by the elastic store fill signal on channel 32. Timing control circuitry 38 generates control signals for timing adjustment which are routed over the timing control bus 41 to the transfer registers TR1, TR2, and TR3.

TR1, TR2, and TR3 transfer registers 27, 28, and 29 are shown in detail in FIG. 5. Each such register contains buffer registers for interfacing with the control store 26 and S2 data buffer store 24 and S3 data buffer store 25. A timing adjustment gate 42 operates under control of the channel control circuitry 38 through the timing control bus 41. Gate 42 modifies the in-channel timing code. The output of timing adjustment gate 42 is fed through switch 43 to either the alignment buffer 44 in TR2 28 or directly to the transfer register 29 in a manner to be described below.

The state of fill of the elastic store 18, is determined by the difference between the rates R1 and R0. Elastic store 18 is nominally operating in a half-full condition which will be denoted by F1=0. When R1 is greater than R0, data begins to accumulate in elastic store 18 resulting in F1 becoming positive. When R1 is less than R0, data is read from elastic store 18 at a rate greater than it is arriving causing F1 to become negative. F1 therefore provides a signed error signal that is used for the control of timing adjustments operations. Timing adjustment control is initiated by monitoring F1, the fill of elastic store 18 over line 32. Whenever F1 is negative R1 is less than R0 and the negative error indicates Ta-bits are to be added. Whenever F1 is positive, R1 is greater than R0 and Ta-bits are deleted. The Ta-addition operation continues until F1 is driven to zero. A filtering operation may be employed on F1 to avoid initiating unnecessary timing adjustments.

Consider now the manner in which timing adjustments are made. Suppose first that the input received clock is slower than the local clock. In this case, over a period of time the fill level of the elastic store 18 will decrease and F1 is negative. To prevent depletion of the elastic store, a timing adjustment must be made. This is accomplished by monitoring the timing code in the next channel to be adjusted. When an opportunity occurs to insert an additional timing bit, reading of the elastic store 18 is inhibited for one bit time and the timing adjustment gate 42 is enabled to insert the additional bit. Thus the output of gate 42 is a continuous data stream. The fill level of the elastic store 18 has increased by one bit and operation continues normally until the next adjustment must be made.

Consider now the effect of inserting the additional bit on subsequent operations in the TR2 and TR3 transfer registers 28 and 29. Control store 26 will indicate the number of bits stored for each channel in the S2 slot alignment store 24. These bits are read from S2 using the address corresponding to the contents of RCA register 19 and stored in alignment buffer 44 of TR2. The received data bits are appended to those obtained for S2 for transfer to TR3 transfer register 29. The additional received bits above the b bits required are stored back in the S2 slot alignment store 24. If a timing adjustment bit has been added, there will be one more bit stored in S2 than is read from S2. Thus, over a period of time, the fill of S2 will tend to increase as timing adjustment bits are added to compensate for the slow input clock.

RCA register 19 is not advanced when timing adjustment bits are added. Thus RCA register 19 will tend to fall behind register 20. RCA register 19 is used as a write address pointer to S3 and TCA register 20 is used as a read address pointer. With a slow input, TCA register 20 will eventually overtake RCA register 19. This situation is compensated for in the implementation by using the data in S2 slot alignment store 24.

Figures 6A, 6B:
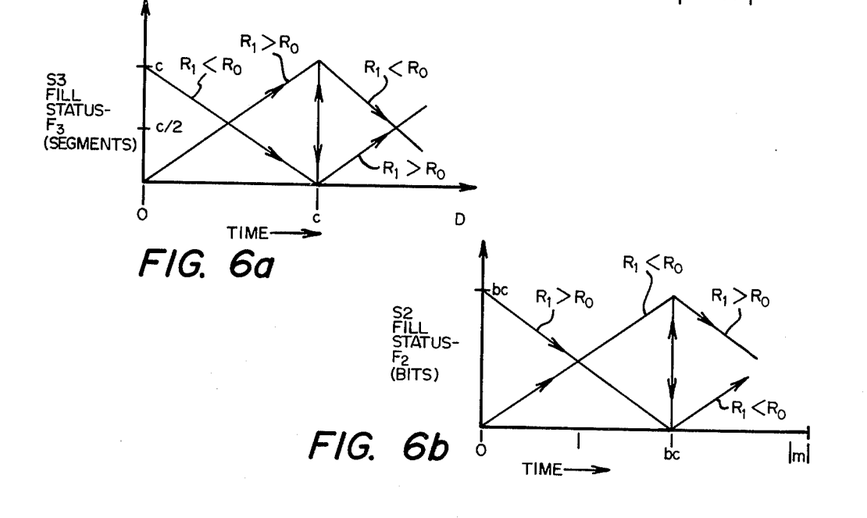
FIGS. 6a and 6b illustrate the buffer fill behavior of buffers S2 and S3.

FIG. 6

FIG. 6 illustrates the fill behavior of S2 and S3 alignment stores 24 and 25 over the frame drift interval period. Consider first the case where R1<R0. FIG. 6a illustrates the fill behavior of S3 in 8 bit segments. FIG. 6b illustrates the fill behavior of S2 in bits. As illustrated in FIG. 6a, the fill of S3, denoted as F3, changes from c segments to zero segments over interval o-c. During the same interval, F2, the fill of S2, changes from 0 to bc bits. Thus, in effect, S3 empties and S2 fills over interval o-c. Recall that S2 fills by virtue of the addition of Ta bits. S3 empties as the count in TCA register 20 overtakes the count in RCA register 19. In effect, data is stored in S3 for continually shorter time intervals over a frame drift period. At the end of the frame drift period, S3 is empty. The next frame of data is output from S2 while the new incoming frame is stored in S3, accounting for the sudden step changes in F2 and F3 at the end of the frame drift interval as indicated in FIG. 6. The output remains continuous and the process then repeats itself. The straight lines charted in FIGS. 6a and 6b assume R1 and R2 to be constant, though different. If R1 is drifting, for example, then the changes plotted in FIGS. 6a and 6b would not be linear.

An opposite situation prevails when R1>R0. As illustrated in FIG. 6, in this situation, the S2 slot alignment store 24 will begin with a fill level, F2, of bc bits. Then the fill level of the S3 frame alignment store, F3, will be zero. As timing adjustment bits are deleted, the level of F2 will decrease. At the same time, F3 will increase as the count in TCA 20 falls further behind the count in RCA 19. In this case, data is stored in S3 for increasing longer time intervals over the frame drift period. At the end of the frame drift interval, S3 will be full and S2 empty. During the next switch frame time, the frame of data in S3 will be read out. New arriving data will be stored in S2. Thus, in one frame switch time, S3 will empty and S2 will fill, accounting once again for the sudden step changes in F2 and F3 indicated in FIG. 6. Again, the output is continuous and the process then repeats itself.

The straight lines charted in FIGS. 6a and 6b represent the case where R0 and R1 are constant, though different. If R1 or R2 drift then the course of the changes in FIGS. 6a and 6b would be non-linear.

The timing adjustment circuit 16 achieves an even distribution of timing adjustments by adjusting a group of contiguous channels whose address is given by the most significant bits of M register 23. If the three most significant bits of M register 23 are used, the ith bit of contiguous channels will be adjusted before the ith bits of the next group of 8 channels are adjusted. It may be desirable to adjust smaller groups. The timing adjustment of each channel is conditioned on the fill of that channel, that is, the ith bits of all channels are adjusted before the i+1 bits are adjusted.

The relationship between buffer fill levels and input-/output rates can be understood by counting the total number of bits in the output data stream during an interval T and setting it equal to the number of bits in the input data stream plus the number of Ta-bit adjustments and the change in the store fill within the timing adjustment circuit 16 as measured on the same interval $\Delta T$.

$$(R0)(\Delta T) = R1(\Delta T) - \Delta F1 - \Delta F2 - \Delta F3 + RD(\Delta T) \quad (3)$$

RD is the rate at which timing corrections are made within the timing adjustment circuit. Solving Eq. (3) for the change in storage fill yields $$\Delta F2 + \Delta F3 + \Delta F1 = (R1 + RD - R0)(\Delta T) \quad (4)$$

Except for small variations in RD due to waiting for the occurrences of available timing adjustment opportunities, RD equals the rate offset between R1 and R0. Hence the right hand side of Eq. (4) is equal to a small value $\epsilon$, the waiting time correction.

$$\Delta F2 + \Delta F3 + \Delta F1 = \epsilon \quad (5)$$

The change in store fill over any interval is approximately zero as indicated in Eq. (5). Thus, the total store fill is approximately equal to a constant over any interval. This constant value is bc.

$$F1 + F2 + F3 = bc + \epsilon \qquad (6)$$

The behavior of the fill F3 of S3 frame alignment buffer 25 is illustrated in FIG. 6(a). F3 is identically equal to the displacement count D in register 22 between write and read addresss which is maintained equal to a whole number of segments. As indicated in FIG. 6a, the fill varies from 0 to c segments. Analytically, the fill behavior is expressed $$F3 = D \bmod c \qquad (7)$$

The fill F2 of the S2 slot alignment buffer 24 is changed by adding or deleting timing adjustment bits. Each time a Ta-bit is added, F2 increases by one bit and each time a Ta-bit is deleted, F2 decreases by one bit. M is a signed variable that is incremented when a Ta-bit is deleted and decremented when a Ta-bit is added. Then the behavior of F2 is a linear function of count M in unit 23 as illustrated in FIG. 6b. As illustrated F2 is based upon a mod bc count, thus the relation $$F2 = (bc - M) \bmod bc \qquad (8)$$

The segment displacement count D in register 22 between read and write positions in S3 in the quantized value of the count M in register 23.

$$D = Q(M) \qquad (9)$$

where Q(M) simply denotes taking the segment count of M. For example, if b=8, c=128, then M register 23 may be an 11 bit plus sign counter. In this case the value in D register 22 is represented by the most significant 8 bits plus sign of M.

Substituting Eqs. (7), (8), and (9) into Eq. (6) yields the behavior of the elastic store as a function of M and the waiting time correction $$F1 = bc + \epsilon - (bc - M) \bmod bc - bQ(M) \bmod c \qquad (10)$$

which simplifies to $$F1 = \epsilon + M - bQ(M) \qquad (11)$$

To further understand this operation, consider the system state just before the occurrence of the end of a frame drift interval with R1<R0. S2 slot alignment store 24 will be almost full and S3 frame alignment store 25 will be almost empty just before this time. The timing relationships are displayed more precisely in FIG. 7 for a 256 channel multiplex group.

Figures 7, 8:
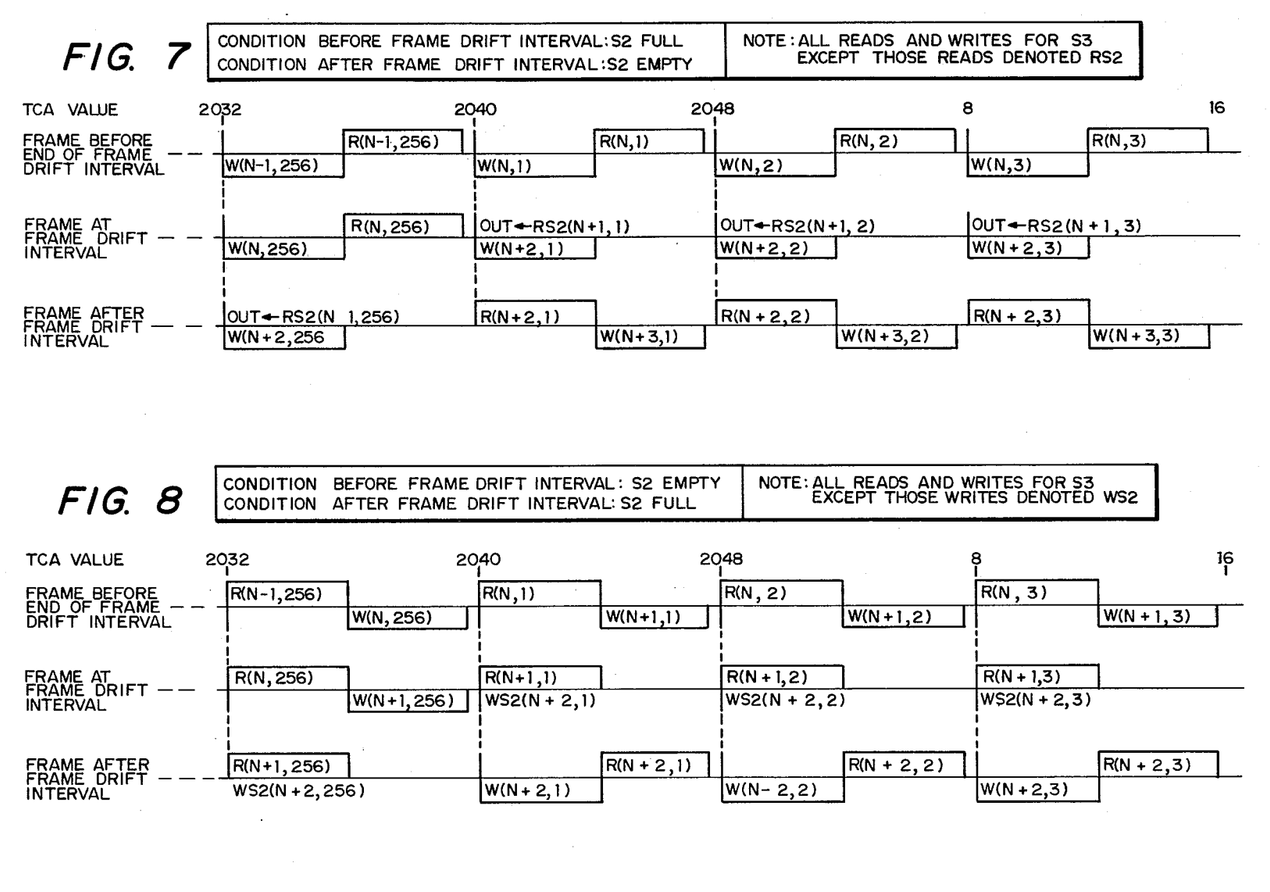
FIG. 7 is a timing diagram illustrating system behavior when the input rate is below the switch rate.
FIG. 8 is a timing diagram illustrating system behavior when the input rate is higher than the switch rate.

In the frame just prior to occurence of the end of a frame drift interval, S2 is full. Successive data words in S2 are read from S2 and written into S3 for output. The word read from S2 is immediately replaced by a new data word. The top line of FIG. 7 illustrates operation during this frame. The writes into S3 are denoted by W (i,j) where i refers to the frame number and j refers to the word within the frame. Reads are denoted in a similar manner as R (i,j). The top line of FIG. 7 illustrates writing and reading of S3. Starting from the left side of this line, word 256 of frame N-1 is written into S3 and immediately read. Subsequent to this, word 1 of frame N is written and then read. Following this, word 2 is written and read and so-forth until word 256 of frame N is written into S3 and then read.

It is at this point that the procedure changes. During the next frame interval, shown in FIG. 7, Line 2, data is transferred directly out of S2 without being written into S3. Thus all data for frame N+1 comes from S2. New arriving data is now written into S3 instead of S2. This is illustrated on the timing diagram by indicating that successive data words for frame N+1 are output directly from S2. Successive newly arriving words are written into S3. This continues until S2 is empty, or for one frame interval. Now the first word for frame N+2 is stored in S3. Hence reading of S3 may now resume as shown in FIG. 7, Line 3. New words are written into S3 with the important difference that the write now follows the read for each successive word. Thus each word now written into S3 will remain there for one complete frame interval before being read. This is illustrated in FIG. 7 by, for example, the reading of word 1 of frame N+2 being followed by the writing of word 1 for frame N+3 and so forth.

S2 is now empty and may be filled again through the addition of timing adjustment bits as previously described.

Data switches 43 and 45 of FIG. 5 provide routing of data to S2, S3 or to the output. These gates are operated from the timing and control bus 41 as indicated in FIG. 5.

FIG. 8

Consider now the situation where the input is running too fast. In this case, timing adjustment bits must be deleted. The elastic store, 18, is monitored and when a preset fill level threshold is reached, the timing control circuitry is signaled through line 34 to make an adjustment. The next channel to be adjusted is scanned for an opportunity to delete a timing adjustment bit. When this opportunity occurs, the read control for the elastic store, 18, is advanced one bit time causing the timing adjustment bit to be skipped in reading of the elastic store. Note that in this case, one less bit will be transferred for this time slot to the TR2 alignment register, 44. Data stored in S2 is read under control of RCA as supplied by the address bus. This data is appended to the received data bits for transfer to TR3 register 29. The remaining bits are stored back in S2 slot alignment store 24. Note that there will now be one less bit stored in S2 for the time slot during which the correction was made. The control store is also updated to reflect this condition.

RCA 19 is advanced when the timing adjustment bit is deleted, decreasing the count D stored in register 22 said count being the difference between the count in TCA register 20 and the count in RCA register 19. In this situation the count in RCA 19 will eventually overtake the count in TCA 20. Once again, the S2 buffer 24 is used to prevent errors when this occurs.

S2 will eventually become empty and S3 will be full. The corresponding timing diagram is illustrated in FIG. 8. In the frame interval preceding the occurence of the end of a frame drift interval, data words are read from S3 and immediately followed by a write in the same location. This condition is illustrated at the left of the top line of FIG. 8. Word 256 of frame N−1 is read from S3. Word 256 of frame N is then written into S3. This is followed by the reading of word one of frame N, writing word one of frame N+1 and so forth. This continues until word 256 of frame N is read and word 256 of frame N+1 is written. It is at this point that the procedure changes. S3 frame alignment buffer 25 is full so that reading of data for output can continue from S3 for frame N+1. However, received data for frame N+2 is now written into S2 slot alignment buffer 24. Thus, at the end of this frame interval, S2 will be full and S3 will be empty.

At the beginning of frame N+2, word one is read from S2 and written into S3. This word is immediately read from S3 as indicated in FIG. 8. Thus successive words are now read from S3 immediately after being written instead of staying in S3 one frame time as they had before the occurrence of the frame drift interval. S2 is now full and adjustments can be made by deleting timing adjustment bits. This action will eventually deplete S2 again with the corresponding one frame time displacement of TCA and RCA and the entire process will repeat itself.

As an example design, consider a system with 256 time division channels (c=256) and 8-bit time slots (b=8). Assume also that the system is to be designed to accommodate 32 kbps channel data rates and is to operate slip-free with a relative clock stability, S, of $10^{**}-6$.

Let the variable length timing code be designed with N=8 and L=15. Thus a T-code bit is inserted after every 8 channel words except that the sixteenth such bit, Ta, may be absent or present depending on the timing correction requirements. With these design values, the timing code overhead can be determined from Eq. (1) as 1.5%.

Let RT denote the rate of the variable length timing code and RC denote the channel data rate. A nominal operating point provides that every other timing adjustment bit is present and yields $$\frac{RT}{RC} = \frac{(2L+1)}{2bN(L+1)} \quad (14)$$

Substituting the example design values yields a nominal timing channel rate of RT=(31/64) kbps. The composite channel rate is then (32+31/64) kbps or 32.484375 kbps (an exact number). The multiplex group link rate R1 is 256 times this value or 8.316 mbps. The frame rate is equal to the composite channel rate divided by b. For b=8, the resulting frame rate is approximately 4.061 k frames/sec. These results are summarized in Table A.

TABLE A

| EXAMPLE SYSTEM DESIGN VALUES | |
|---|---|
| Number of Channels (c) | 256 |
| Channel segment size (b) | 8 |
| T-code parameters (N, L) | (8, 15) |
| Nominal Channel Data Rate (RC) | 32 kbps |
| Nominal T-code Rate (RT) | (31/64 kbps) |
| Multiplex Link Group Rate (R1) | 8.316 Mbps |
| Multiplex Channel Rate (R1/c) | 32,484375 kbps |
| Multiplex Frame Rate | 4.061 frames/sec |

With c=256 and b=8, S2 and S3 will both be 256×8 stores. The frame length will be 2048 bits. With R1=8.316 Mbps and a relative stability, S, of $10^{**}-6$, the maximum drift rate will be +8.316 bps. The frame drift period, Tc, follows as (2048/8.316)=246.272 seconds. During this time eight adjustments must be made in each channel.

The nominal rate of in-channel timing adjustment opportunities, RD, is (1/2079)(R1/c)=15.625 adjustment opportunities/sec. Recall that the elastic store drift rate while waiting for Ta-bits is +8.316 bps.

Adjustments are made on a per channel basis with the ith bit of every channel being corrected before the (i+1) bit is corrected on any channel. Just prior to initiating the (i+1) corrections, there will be one channel left which has not yet had the ith correction made. If the system must wait one second for a Ta opportunity in this last channel, the elastic store fill will change by 8.316 bits.

Zero crossings occur in the frame drift cycle when the count in TCA 20 equals the count in RCA 19, that is when the value of D=0. D is not incremented until the last timing correction is made. Thus there is no possibility of an error while waiting to make the last timing bit adjustment. Rather, the fill of the elastic store changes until an adjustment opportunity occurs. Then the last timing adjustment would be initiated (1/2048)th of a frame drift interval from the frame drift cycle zero crossing. With a frame drift interval of 246.272 seconds, this would leave 0.120 seconds to make the last correction which corresponds to an average of 1.879 adjustment opportunities. However, the elastic store allows this time to be extended several seconds if necessary before the final adjustment must be made, thus ensuring slip-free operation. Also, adjusting channels in groups using, for example, the eight most significant bits of the M register 23 will alleviate this situation.

The worst case waiting time will be a function of the number of tandem switches. The time interval between timing adjustment bits will be 1/15.625=0.0640 secs. In this time, the elastic store error would change by (8.316)(0.0640)=(0.5322) bits. With k tandem switches, it is possible that k successive adjustment opportunities would already be used. In this case, the elastic store error would change by (k+1) 0.5322 bits before an available opportunity presented itself. With any reasonable number of tandem switches, a small elastic store will accommodate worst case situations.

The above values are summarized in Table B along with values for a $10^{**}-5$ relative stability. The selected T-code can also handle this case. General expressions for each of the performance values are also summarized in Table B.

TABLE B

| PERFORMANCE VALUES WITH $10^{-5}$ and $10^{-6}$ RELATIVE STABILITY | | | |
|---|---|---|---|
| Relative Stability | $10^{-6}$ | $10^{-5}$ | General Expression |
| Average Adjustment Opportunities/secs. ($R_D$) | 15.625 | 15.625 | $\frac{R_1}{c(2bN(L+1)+2L+1)}$ |
| Frame Drive Period (secs) (FDP) | 246.272 | 24.627 | $\frac{R_1 S}{bc}$ |
| Adjustment Opportunities per channel in (FDI/2048) sec (A) | 1.879 | 0.188 | $\frac{1}{Sc(2bN(L+1)+2L+1)}$ |
| ΔF1 per Ta-bit per channel | .532 | 5.322 | $Sc(2bN(L+1)+2L+1)$ |
| Equivalent Doppler Velocity (knots) $V_d$ | 582.750 | 5827.500 | S (velocity of light) |

It should be understood that the described embodiments are illustrative of the invention. Other arrangements may be devised by those skilled in the art without departing from the spirit and scope of the invention as defined by the appended claims.

We claim:

1. Slip free digital switching of a plurality of multiplexed digital data streams where each said stream is composed of c multiplexed communication channels and where each said multiplex stream may have a different clock rate R1, R2 . . . Rc all of which may be different from the switch clock rate comprising the steps of
   (a) inserting a variable length timing code, one bit at at time, in each of said c channels in each multiplexed digital data stream wherein said multi-bit timing code is composed of successive variable length code words of length L and L+1 with the first L bits of each code word designating whether the code word length is L or L+1 bits,
   (b) adjusting individual channel rates in each of said c channels in each of said multiplexed data streams by altering the length of said variable length code words making variable length code words of length L equal to code words of length L+1 where the input clock is slower than the switch clock and making input code words of length L+1 equal to code words of length L where the input clock is faster than the switch clock thereby equalizing the respective clock rates by the adjustment of just a sufficient set of said code words in each of said channels to result in equal rates,
   (c) storing incoming bits of said multiplex data stream under control of the incoming clock rate and reading said bits under control of said switch clock thereby aligning bit timing with switch clock timing,
   (d) sensing clock rate differences for control of channel timing adjustments to compensate for said clock rate differences,
   (e) aligning slots for each of the individual c channels by storing up to b bits per channel, with excess bits of each channel stored in a slot alignment store when addition of timing adjustment bits results in b+1 bit channel word lengths, and reading previously stored bits from said slot alignment stored to yield b bit words for transmission when timing bits are deleted from a multiplex channel,
   (f) aligning frames by storing b bit data words for each channel after slot alignment with successive words read from said slot alignment store in synchronism with switch clock frame alignment, and
   (g) switching said data streams under the control of said clock of said switch.

2. The method of claim 1 further comprising counting received channel words in a receive channel address counter to control (i) storage and reading of successive channels in said slot alignment store, (ii) storage in said frame alignment store, and counting further transmitted channel words in a transmit channel address counter to control reading of said frame alignment store, the receive address count being synchronized with the received word rate and the transmit address count being synchronized with the transmit word rate, whereby the displacement between said counts module c grows over a period of time at a rate determined by the rate difference of the received clock and the switch clock, and the time for said displacement to accumulate from 0 to c being the frame drift interval.

3. The method of claim 2 further comprising adding timing adjustment bits in each successive channel over the period of frame drift interval to increase from 0 bits to b bits the fill of said slot alignment store for each channel over the period of the frame drift interval when the input multiplex digital data stream clock is slower than the switch clock.

4. The method of claim 3 where the input clock runs slower than the switch clock and where at the beginning the frame drift interval said frame alignment store is full and said slot alignment store is empty, further comprising storing successive input words in said frame alignment store for output, while said slot alignment store fill level increases by one bit each time a timing adjustment bit is added, decreasing the displacement between said receive address counter and said transmit address counter and decreasing the fill level of said frame alignment store, said slot alignment store and said frame alignment store continuing to increase and decrease respectively over the period of the frame drift interval until the end of said interval at which time said slot alignment store is full and said frame alignment store is empty, during the next output frame transfering data words directly from said slot alignment store bypassing said frame alignment store, and, simultaneously storing the next input frame directly in said frame alignment store whereby at the end of said next input frame time said frame alignment store is again full and said slot alignment store is empty said permitting repeat of the entire process over the next frame drift interval for a continuous output flow of the switch clock rate thereby to facilitate time division switching without slip errors.

5. The method of claim 2 further comprising deleting timing adjustment bits in each successive channel over the period of the frame drift interval to decrease stored bits from b bits to 0 bits in said slot alignment store for each channel over the period of the frame drift interval when the input clock is faster than the switch clock.

6. The method of claim 5 where the input clock runs faster than the switch clock and where at the beginning of a frame drift interval said slot alignment store is full and said frame alignment store is empty, further comprising transfering successive words from said slot alignment store to said frame alignment store for output while storing newly arriving words in said slot alignment store to replace words transferred to the frame alignment store, said slot assignment store fill decreasing by one bit each time an incoming timing adjustment bit is deleted, thereby increasing the displacement between the counts in said receive address counter and said transmit address counter while increasing the fill level of said frame alignment store, said fill levels of said slot alignment store and said frame alignment store decreasing and increasing respectively over the period of the frame drift interval until the end of said interval at which time said frame alignment store is full and said slot alignment store is empty, during the next output frame reading data words from said frame alignment store without replacement while storing in said slot alignment store whereby at the end of said next input frame time said slot alignment store is again full and said frame alignment store is empty permitting repeat of the entire process over the next frame drift interval for a continuous output flow at the switch clock rate thereby to facilitate time-division switching without slip errors.

7. A slip free timing adjustment system to adjust channel timing for a multiplexed digital data stream with c time division channels preparatory to switching said channels in a digital time-division circuit switch, where said multiplex digital data stream arrives at said switch at a rate RO and said switch clock rate is at a rate R1, said RO and R1 rates being potentially different, said system comprising:

(a) means for inserting a variable length timing code, one bit at a time, in each of said c channels in each multiplexed digital data stream where said multibit timing code is composed of successive variable length code words of length L and L+1 with the first L bits of each code word designating whether the code word is of length L or L+1 bits, (b) adjustment means for receiving said multiplexed data stream and adjusting individual channel rates in each of said c channels including means for altering the length of said variable length code words by adjusting code words of length L to code words of length L+1 when the input clock is slower than the switch clock and for adjusting code words of length L+1 equal to code words of length L when the input clock is faster than the switch clock thereby equalizing the respective clock rates by the adjustment of just a sufficient set of code words in each of said channels to result in equal rates, said adjustment means comprising, (i) a demodulator forming part of the input of said adjusting means for demodulation of the received multiplexed digital data stream and recovery of the received data clock, (ii) an elastic store means coupled to the output of said demodulator to provide bit alignment of received multiplexed digital data stream, (iii) a control store means for storing channel state information during channel timing adjustment, (iv) a slot alignment store means for storing a variable number from 0 to b bits for each received channel during timing adjustment, (v) a frame alignment store means for providing output frame alignment with said digital switch, (vi) a local frequency source means common to said switch clock, (vii) a transmit address counter connected to be synchronized with said local frequency source to provide transmit channel identification, (viii) a receive address counter connected for providing receive channel identification, (ix) a displacement register connected for measuring the difference between the count in said transmit address counter and said receive address counter, (x) a measurement register means connected for controlling the number of timing adjustments performed, (c) means for storing incoming bits of said multiplex data stream in elastic store means under control of the incoming clock rate and for reading said bits under control of said switch clock thereby aligning bit timing with switch clock timing.

(d) means for sensing clock rate differences and making necessary in channel timing adjustments to compensate for said differences, (e) means for providing slot alignment for each of the individual c channels by providing b bits of storage means per channel, with means to store extra bits for each channel in the slot alignment store when timing adjustment bits are added resulting in b+1 bit channel word lengths instead of b bit channel words and with previously stored bits supplied from the slot alignment store means to yield b bit words for transmission when a timing bit is deleted from a multiplex channel, (f) frame alignment store means for storage of b bit data words for each channel after slot alignment with successive words read from said frame alignment store in synchronism with switch clock frame alignment, and (g) means for transmitting said adjusted time-division multiplexed channels to a digital-time-division switch for channel switching under control of the switch clock.

8. The system of claim 7 which further comprises a receive channel address count means for counting received channel words and controlling storage and reading of successive channels in said slot alignment store means and storage in said frame alignment store means, and means for counting of the output words using a transmit channel address counter means used to control reading of said frame alignment store means, means for synchronizing said receive address counter means with the received word rate, means for synchronizing said transmit address counter means with the transmit word rate whereby the displacement between the resulting counts grows over a period of time at a rate determined by the rate difference of the received clock and the switch clock, said counts being made modulo c with the time for the displacement to accumulate from 0 to c being the frame drift interval.

9. The system of claim 8 further comprising means for adding timing adjustment bits in each successive channel over the period of said frame drift interval to increase from 0 bits to b bits the fill of said slot alignment store means for each channel over the period of said frame interval when the input multiplex digital data stream clock is slower than the switch clock.

10. The system of claim 9 responsive to an input clock running slower than said switch clock and where at the beginning of the frame drift interval said frame alignment store means is full and said slot alignment store means is empty further comprising: means for storing successive input words in said frame alignment store means for output, means for increasing the fill of said slot alignment store means by one bit each time a timing adjustment bit is added, while causing a decrease in the displacement between the counts in said receive address counter means and in said transmit address counter means and a decrease in the fill of said frame alignment store means whereby the fill levels of said slot alignment store means and said frame alignment store means continue to increase and decrease respectively over the period of said frame drift interval until the end of said interval when said slot alignment store means is full and said frame alignment store means is empty, means to transfer the next output frame directly from said slot alignment store means without being placed in said frame alignment store means, means for storing the next input frame directly in said frame alignment store means whereby at the end of said next said output frame said frame alignment store means is again full and said slot alignment store means is empty preparatory to repeating the entire process over the next frame drift interval for continuous output flow with channels at the switch clock rate for time division switching without slip errors.

11. The system of claim 9 responsive to an input clock running faster than said switch clock and where at the beginning of the frame drift interval said slot alignment store means is full and said frame alignment store means is empty, further comprising: means for transferring successive words from said slot alignment store means to said frame alignment store means for output, means for storing newly arriving words in said slot alignment store means to replace words transferred to said frame alignment store means, means for decreasing the fill of said slot alignment store means by one bit each time an incoming timing adjustment bit is deleted while causing an increase in the displacement between the counts in said receive address counter means and in said transmit address counter means and an increase in the fill level of the frame alignment store means whereby the fill levels of said slot alignment store means and of said frame alignment store means continue to decrease and increase respectively over the period of said frame drift interval until the end of said interval when said frame alignment store means is full and said slot alignment store means is empty, means for reading the next output frame from said frame alignment store means without replacement and for storing the next input frame in said slot alignment store means whereby at the end of said next output frame said slot alignment store means is again full and said frame alignment store means is empty preparatory to repeating the entire process over the next frame drift interval for continuous output flow with channels at the switch clock rate for time-division switching without slip errors.

12. The system of claim 8 further comprising means for deleting timing adjustment bits in each successive channel over the period of said frame drift interval to decrease from b bits to 0 bits the fill of said slot alignment store for each channel over the period of said frame drift interval when the input clock is faster than the switch clock.

* * * * *

UNITED STATES PATENT AND TRADEMARK OFFICE
CERTIFICATE OF CORRECTION

PATENT NO. : 4,270,203
DATED : May 26, 1981
INVENTOR(S) : Arthur A. Collins, Et Al It is certified that error appears in the above—identified patent and that said Letters Patent is hereby corrected as shown below:

Column 1, in the title, delete "TECHNICAL FIELD".

Column 1, before first paragraph (line 5), insert heading --TECHNICAL FIELD--.

Column 2, line 41 (page 4, line 9), change "coommon" to --common--.

Column 3, line 31 (page 6, line 9), change "C" to --c--.

Column 4, line 67 (page 8, line 21), change "were" to --where--.

Signed and Sealed this

Eighteenth Day of August 1981

[SEAL]

Attest:

GERALD J. MOSSINGHOFF

Attesting Officer

Commissioner of Patents and Trademarks